United States Patent [19]

Hehl

[11] 4,104,007

[45] Aug. 1, 1978

[54] ELASTIC SUPPORT FOR HYDRAULIC PUMP OF INJECTION MOLDING

[76] Inventor: Karl Hehl, Arthur-Hehl-Strasse 32, 7298 Lossburg, Fed. Rep. of Germany

[21] Appl. No.: 729,035

[22] Filed: Jan. 4, 1976

[30] Foreign Application Priority Data

Oct. 4, 1975 [DE] Fed. Rep. of Germany ....... 2544536

[51] Int. Cl.² ............................................. F16F 15/20
[52] U.S. Cl. .................................... 417/360; 417/363; 248/15
[58] Field of Search .................. 417/363, 360; 248/15, 248/18, 21

[56] References Cited

U.S. PATENT DOCUMENTS

| 2,253,597 | 8/1941 | Wyne ..................................... 417/363 |
| 2,558,541 | 6/1951 | Cotten ..................................... 248/15 |
| 2,755,016 | 7/1956 | Busch .................................. 417/363 X |
| 2,764,100 | 9/1956 | Maisch .................................. 417/360 |
| 2,857,189 | 10/1958 | Jeffery ............................ 248/18 UX |
| 3,291,383 | 12/1966 | Butts ................................. 417/363 X |
| 3,801,229 | 4/1974 | Henderson ........................ 417/363 X |
| 3,982,856 | 9/1976 | Hehl .................................. 417/363 X |

FOREIGN PATENT DOCUMENTS 2,201,078 7/1973 Fed. Rep. of Germany ........... 417/360

*Primary Examiner*—William L. Freeh
*Assistant Examiner*—Richard E. Gluck
*Attorney, Agent, or Firm*—Joseph A. Geiger

[57] ABSTRACT

A vibration damping elastic supporting device for the hydraulic pump of an electro-hydraulic power unit which is mounted in the machine base of a production machine and in which several strut rods, forming a rigid pump supporting structure, extend axially from a clamping flange of the electric motor to pump support points in the vicinity of a radial plane through the centroid of the pump, the strut rods extending through supporting bores of the pump body, or of an attached adaptor body, holding and axially clamping a pair of elastomeric collar sleeves between each rod extremity and a supporting bore.

8 Claims, 4 Drawing Figures

ELASTIC SUPPORT FOR HYDRAULIC PUMP OF INJECTION MOLDING

BACKGROUND OF THE INVENTION

1. Field of the Invention

The present invention relates to mounting structures for electro-hydraulic drive units in production machines and, more particularly, to a vibration damping supporting device for the hydraulic pump of a self-contained electro-hydraulic power unit which is mounted in the machine base of an injection molding machine.

2. Description of the Prior Art

In U.S. Pat. No. 3,982,856 is disclosed a vibration damping mounting arrangement of an electro-hydraulic power unit for an injection molding machine, in which the hydraulic pump and the electric drive motor form a compact structurally rigid unit reaching horizontally through a side wall of the machine base, the inside of which forms a tank compartment containing hydraulic fluid. This power unit is so arranged that the hydraulic pump is located on the inside of the vertical supporting wall, above the hydraulic fluid, while the electric drive motor is located on the outside of the wall, for better cooling. This drive unit is supported on the vertical wall of the machine base by engaging the wall portion surrounding a large aperture with clamping flanges and interposed resiliently compressible discs of a vibration absorbing elastomeric material. A tapered centering formation in the supporting wall assures that the clamping flanges of the power unit cannot shift into metal-to-metal contact with the wall.

It has now been found that this power unit mounting arrangement, though free of rigid contact points with the supporting machine base, nevertheless may become subject to radial vibrations of the hydraulic pump which are not attenuated by the straddle-type mount of the power unit on the side wall of the machine base. These radial vibrations, in turn, have a tendency to generate secondary vibrations. For example, a considerable noise output by the coupling elements of the power unit has been traced to these radial vibrations.

While efforts have been made in the past to develop special low-noise hydraulic pumps of various types, including radial piston pumps, axial piston pumps, and rotating vane pumps, the actual noise reducing benefits of these efforts have been modest at best.

SUMMARY OF THE INVENTION

Underlying the present invention, therefore, is the objective of improving the structure of the electro-hydraulic power unit in such a way that the radial vibrations and the associated noise generated by the power unit are substantially reduced, particularly in the case where the hydraulic pump is a radial piston pump.

The present invention proposes to attain the above objective by suggesting a device for elastically supporting the hydraulic pump of a power unit by means of a pump supporting structure which is rigidly connected to the electric motor and which reaches into the vicinity of a radial plane through the centroid of the hydraulic pump, where the pump supporting structure defines several pump support points on which the pump unit is connected to the pump supporting structure by means of elastomeric connecting elements which are engaged on opposite sides of an elastomeric wall thickness.

In a preferred embodiment of the invention, the hydraulic pump is part of a self-contained power unit which is arranged horizontally in the machine base of an injection molding machine, being mounted on a vertical outside wall of the latter by means of opposing clamping flanges surrounding an aperture in the wall. While the outer clamping flange carries the electric motor, the inner clamping flange serves as an anchoring body for several inwardly extending strut rods forming part of the pump supporting structure. The strut rods have preferably a threaded portion on one of their extremities with which they are screwed into the clamping flange and a reduced diameter on their opposite extremity with which they reach to the pump support points.

The pump unit has a pump body with axial supporting bores at the pump supporting points, each supporting bore surrounding a reduced diameter portion of a strut rod with an annular gap for the elastomeric connecting elements. The latter are preferably a pair of collar sleeves associated with each pump support point, the collars of the elastomeric sleeves engaging axially forwardly and rearwardly oriented positioning faces of the pump body. By providing an axial clamping configuration with the aid of washers carried by the strut rod, the pump unit can be confined axially under preload, without any metal-to-metal contact between the pump unit and the pump supporting structure.

The term "pump unit," to the extent that it is employed in this disclosure and in the appended claims, should be understood to include the hydraulic pump itself, including its drive shaft, and any pipes or other hydraulic control components which are rigidly connected to the pump body. In the case where the hydraulic power unit includes two hydraulic pumps which are directly bolted to one another and driven by a common drive shaft, the term "pump unit" is to be interpreted as including both pumps and any intermediate attachment members. Similarly, where an adaptor body is bolted to the pump body, in order to provide the supporting bores at the pump support points, such an adaptor body would be a part of the pump unit, for the determination of the location of the radial centroid plane of the latter.

While the preferred embodiment of the invention utilizes two axially spaced elastomeric connecting elements at each pump support point, and the two connecting elements are preferably located on opposite sides of the centroid plane, such an arrangement need not be rigorously followed in order to obtain the benefits of the present invention, it being possible to have the centroid plane pass through one of the connecting elements or even a small distance axially outside both connecting elements. Alternatively, it is also possible to use only a single elastomeric connecting sleeve at each pump support point.

A modified embodiment of the invention suggests the use of an adaptor body with supporting bores for the elastomeric elements. This has the advantage that a commercially available hydraulic pump of standardized dimensions can be used and that the connected hydraulic circuitry components can likewise be of standardized design. Such an adaptor body consists preferably of a radially extending plate-like wall of rectangular outline with a centering bore engaged by a cylindrical extension of the pump body, each corner of the adaptor body carrying an axially extending supporting socket with a supporting bore. The adaptor body is preferably bolted to appropriate mounting faces of the pump body.

BRIEF DESCRIPTION OF THE DRAWINGS

Further special features and advantages of the invention will become apparent from the description following below, when taken together with the accompanying drawings which illustrate, by way of example, two embodiments of the invention, represented in the various figures as follows.

DESCRIPTION OF THE PREFERRED EMBODIMENTS

Figure 1:
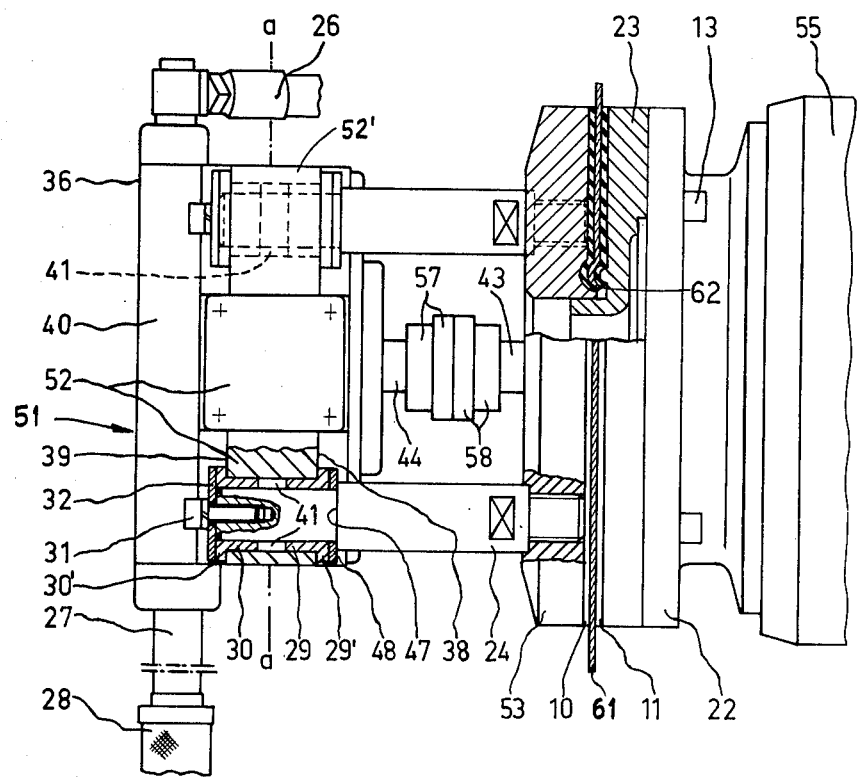
FIG. 1 shows an electro-hydraulic power unit for an injection molding machine, with a partially cross-sectioned pump supporting device embodying the invention.
Figure 2:
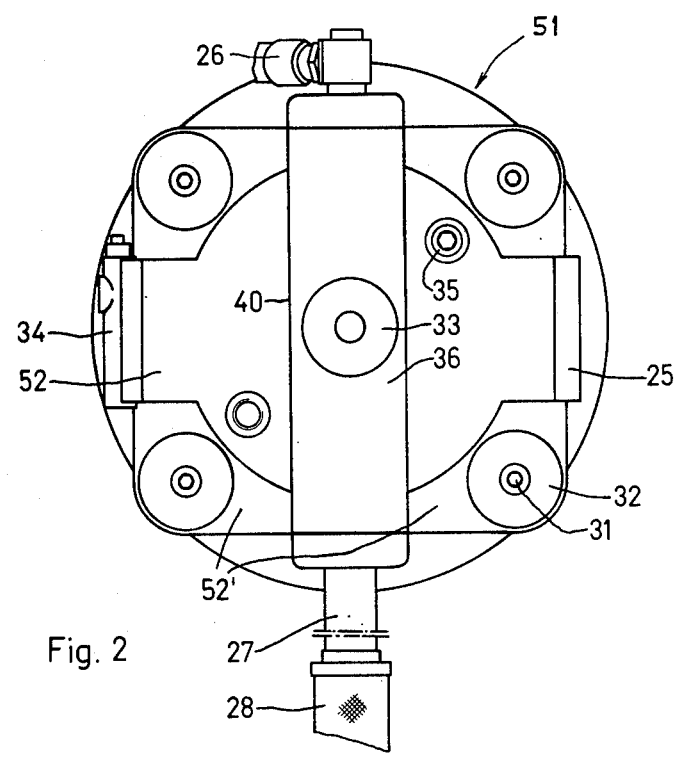
FIG. 2 is an end view of the pump supporting device of FIG. 1.

Referring to FIGS. 1 and 2 of the drawing, there is shown a first embodiment of the invention, featuring a self-contained electro-hydraulic power unit of an injection molding machine. This power unit includes an electric motor 55 whose flange 22 is axially bolted to a centering flange 23 which, in turn, is supported on a vertical outside wall 61 of the machine base, so that the electric motor is situated on the outside of the machine base. An opposing strut flange 53, arranged on the inner side of the machine base wall 61, forms a rigid connection with the centering flange 23, while both flanges engage resiliently compressible discs 10 and 11 which are interposed between them and the vertical wall 61, surrounding a wall aperture 62. As a result, the power unit is elastically supported on the machine base wall 61, without any metal-to-metal contact between the power unit and the machine base. Further details of such an elastic power unit support are disclosed in U.S. Pat. No. 3,982,856.

The hydraulic pump unit 51, located inside the machine base, in the upper portion of a hydraulic fluid compartment and above its fluid level, is supported by means of four horizontally extending strut rods 24 which are rigidly attached to the strut flange 53 by means of appropriate threaded connections. The four strut rods are preferably arranged at the four corners of a rectangle, extending parallel to and at identical distances from the horizontal center axis of the power unit, as defined by the drive shaft 43 of the electric motor 55 and the pump shaft 44 of the pump unit 51. Coupling members 57 and 58, carried by the pump shaft 44 and by the motor drive shaft 43, respectively, connect the two shafts.

A line a—a in FIG. 1 indicates the axial location of the centroid, or center of gravity, of the pump unit 51. In a radial plane through this centroid, the pump body 52 has a flange portion 52' (FIG. 2) of generally rectangular outline, an axial supporting bore 41 being arranged in each of its four corners, in axial alignment with the four strut rods 24 of the pump supporting structure. The strut rods 24, where they reach into the supporting bores 41, have a reduced diameter portion on which are seated two elastomeric sleeves 29 and 30. These sleeves are so arranged that they are tightly sealed on their inner and outer diameters against the strut rods 24 and against the supporting bores 41, respectively. The elastomeric sleeves 29 and 30 are preferably of a high-polymer resiliently compressible material.

The elastomeric sleeves 29 and 30 have sleeve collars 29' and 30', respectively, with which they engage axially oppositely oriented positioning faces 38 and 39 of the body portion 52' of the pump body 52. Behind the sleeve collar 29' of the rear sleeve 29, and in front of the sleeve collar 30' of the front sleeve 30 are arranged two washers 48 and 32, respectively, which provide an axial clamping action against the positioning faces 38 and 39 of the pump body. This clamping action is produced by means of a clamping shoulder 47, formed by the transition from the reduced diameter portion to the full diameter portion of the strut rod 24, against which the rear washer 48 is supported, and by a clamping bolt 31 which is threaded axially into the forward extremity of the strut rod 24 and which pulls the front washer 32 rearwardly. As a result of this configuration, the pump body 52 is axially confined and preloaded in relation to the strut rods 24, while being entirely free of any metal-to-metal contact between the pump body 52 and the pump supporting structure.

Since the radial centroid plane a-a of the pump unit 51 is that plane in which radial vibrations of the hydraulic pump can be counteracted without creating transversely oriented pitching moments on the pump unit 51, the arrangement of pairs of elastomeric sleeves on opposite sides of the radial centroid plane a—a provides a stable support which effectively dampens the radial vibrations of the hydraulic pump.

However, depending on the particular hydraulic circuitry requirements of the injection molding machine, there may be a need for the addition of a second hydraulic pump to the pump unit 51. For this purpose, the pump body 52 includes a forwardly facing connecting mount 40 with a mounting face 36 and a connecting element 33 (FIG. 2). Such a coaxial attachment of a second hydraulic pump will, of course, shift the radial centroid plane a—a forwardly in relation to the location which is shown in FIG. 1. It should therefore be understood that, while the ideal location of the elastomeric sleeves 29 and 30 is on opposite axial sides of the radial centroid plane a—a, the latter may also be located in a position in which it intersects one set of elastomeric sleeves, or even in a position located a small distance to the outside thereof.

Figure 3:
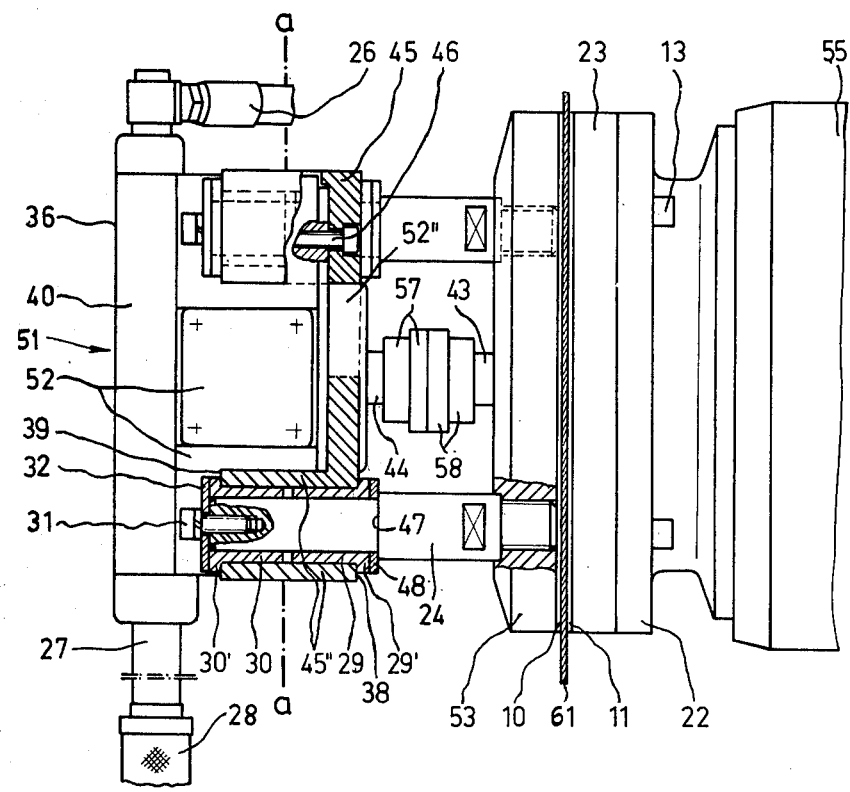
FIG. 3 shows an electro-hydraulic power unit similar to that shown in FIG. 1, with a second embodiment of a pump supporting device, shown partially in cross section.
Figure 4:
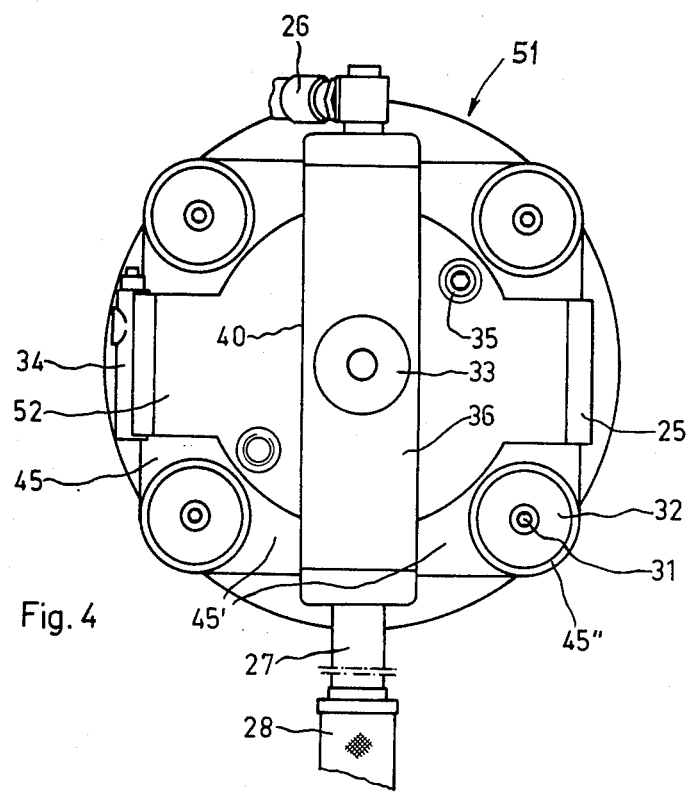
FIG. 4 is an end view of the pump supporting device of FIG. 3.

A modified embodiment of the invention is illustrated in FIGS. 3 and 4. There, the pump unit 51 includes a commercially available hydraulic pump which does not have the necessary body configuration for the elastic supporting device of the invention. The pump unit 51 of this embodiment, therefore, includes an adaptor body 45 which is bolted against a suitable mounting face on the rear side of the pump body 52 by means of a number of bolts 46. For an accurate positioning of the pump body 52 in relating to the adaptor body 45, the latter has a centering bore engaging a central housing extension 52" of the pump body 52.

The adaptor body 45 consists essentially of a flange-shaped radial wall 45' of rectangular peripheral outline (see FIG. 4), with four axially oriented supporting sockets 45" extending forwardly from its four corners. These supporting sockets 45" accommodate the supporting bores 41 in the four support points of the pump unit 51. The operational result of this arrangement is essentially the same as that achieved with the structural configuration of the embodiment of FIGS. 1 and 2, namely, that the elastomeric collar sleeves 29 and 30, which are seated on the forward extremities of the strut rods 24, support the pump unit 51 on opposite sides of its radial centroid plane a—a. The adaptor body 45 is, of course, a part of the pump unit 51, for purposes of determining the location of its radial centroid plane a—a.

The use of a commercially available hydraulic pump has the advantage that it also permits the use of standardized hydraulic circuitry components by means of which the hydraulic pump is connected to the hydraulic circuit of the injection molding machine. To the extent that these components are rigidly attached to the pump body 52 of the unit, they execute the same radial vibrations as the latter and are therefore also part of the pump unit 51. They include the connection of the pressure line 26, and the intake line 27, including the intake filter 28. Further shown in the drawing are a tank line 35, a volume control member 25, and a pressure control member 34.

The present invention offers a number of important advantages. In addition to the effective vibration damping action achieved, the device is distinguished by its simplicity of structure and its adaptability to different operational requirements. The structural simplicity of the device reflects itself in low manufacturing costs. In addition, the novel elastic pump supporting device is very easy to assemble, and the elastomeric sleeves can be quickly replaced, if necessary.

The device of the invention lends itself readily for modification, if the pump support points are to be shifted in the axial direction. Such a shift can be implemented by replacing the adaptor body 45 with an adaptor body which has its supporting sockets 45" located in a different axial plane. In this case, the strut rods 24, or one of the drive shafts 43 or 44, has to be shortened or lengthened accordingly.

It should be understood, of course, that the foregoing disclosure describes only preferred embodiments of the invention and that it is intended to cover all changes and modifications of these examples of the invention which fall within the scope of the appended claims.

I claim the following:

1. A device for elastically supporting a hydraulic pump as part of an electro-hydraulic pump unit of a production machine, such as a hydraulic drive unit of an injection molding machine, where the power unit includes a hydraulic pump with a central drive shaft which is coaxially coupled with the drive shaft of an electric motor, and the power unit is mounted on a stationary base of the machine in the manner of a self-contained assembly by means of supporting members which carry the weight of the assembly; the elastic pump supporting device comprising in combination:

a pump supporting structure extending axially forwardly from the electric motor to the pump, on opposite sides of the unit center axis defined by said coupled drive shafts, the pump supporting structure being rigid and solidary with the electric motor and including a plurality of strut rods reaching forwardly at least far enough to intersect a radial plane through the centroid of the hydraulic pump;

a plurality of pump support points defined by the pump supporting structure in the vicinity of said radial centroid plane, said support points being spaced around the pump centroid;

the pump includes a pump body portion having axial supporting bores in alignment with said pump support points;

each strut rod is aligned with a pump support point, extending forwardly through the associated supporting bore of the pump body, but with a smaller diameter than said bore, so as to define an annular gap therewith; and a plurality of elastomeric sleeve elements arranged at the pump support points, in said annular gaps, each sleeve element engaging a supporting bore of the pump body and a strut rod of said supporting structure on opposite sides of an elastomeric material thickness in such a configuration that direct metallic contact between the two structures is precluded.

2. An elastic pump supporting device as defined in claim 1, wherein two elastomeric connecting elements are arranged at each pump support point on axially opposite sides of said radial centroid plane of the pump structure.

3. An electric pump supporting device as defined in claim 1, wherein each supporting bore in the pump body extends between oppositely oriented front and rear positioning faces of said pump body portion;

each elastomeric sleeve element has a flange-like enlarged collar on one axial extremity, a pair of sleeve elements being seated in each supporting bore in such a way that their collars engage said positioning faces from the front and rear, respectively; and each strut rod defines a pair of forwardly and rearwardly oriented clamping faces with which it engages the collars of the elastomeric sleeve elements in such a way that the latter are clamped against said positioning faces, the strut rod including means for obtaining said clamping action, whereby the hydraulic pump is elastically supported in the axial sense.

4. An elastic pump supporting device as defined in claim 3, wherein the portion of each strut rod which extends through the supporting bore of the pump body is smaller in diameter than a rearwardly adjoining rod portion, thereby forming a forwardly facing clamping shoulder;

each strut rod carries a rear washer positioned by said clamping shoulder and defining its forwardly oriented clamping face and a front washer defining its rearwardly oriented clamping face;

the clamping means of the strut rod includes a bolt in a threaded center bore in the forward extremity of the rod which pulls the front washer rearwardly.

5. An elastic pump supporting device as defined in claim 1, wherein the hydraulic pump has a housing representing the main body of the pump; and the pump body portion containing said supporting bores is an adaptor body which is rigidly attached to the body of the pump.

6. An elastic pump supporting device as defined in claim 5, wherein the hydraulic pump has its main body defined in part by a rearwardly extending generally cylindrical housing portion;

the adaptor body includes a generally flat, radially oriented wall of rectangular outline with a central opening therethrough, for centering cooperation with said cylindrical housing portion, and four axially oriented supporting sockets extending forwardly from said wall near its four corners; and the supporting bores are arranged in the four supporting sockets.

7. An elastic pump supporting device as defined in claim 1, wherein the supporting members by means of which the power unit is mounted on the machine base are arranged axially between the hydraulic pump and the electric motor; and said supporting members include at least one mounting member which is solidary with the electric motor and which also forms a part of said pump supporting structure.

8. An elastic pump supporting device as defined in claim 7, wherein the machine base includes a vertical wall with a mounting aperture for the power unit;

the power unit extends horizontally through the mounting aperture, engaging the wall portion around the latter with an outer clamping flange on the rear side of the wall and an inner clamping flange on the front side of the wall and with two resilient compression discs interposed between said flange and the wall, said flanges and discs constituting the power unit supporting members;

the electric motor is bolted directly to the outer clamping flange; and the pump supporting structure is constituted, at least in part, by the inner clamping flange and by at least two parallel strut rods extending forwardly therefrom and supporting the hydraulic pump on their forward extremities.

* * * * *